(12) United States Patent
Li et al.

(10) Patent No.: US 12,375,190 B2
(45) Date of Patent: Jul. 29, 2025

(54) POWER COMPENSATION DETERMINATION FOR RADIO FREQUENCY CABLE

(71) Applicant: HEWLETT PACKARD ENTERPRISE DEVELOPMENT LP, Spring, TX (US)

(72) Inventors: Kuanyue Li, Beijing (CN); Xuguang Jia, Beijing (CN); Hongli Zhang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 186 days.

(21) Appl. No.: 18/449,384

(22) Filed: Aug. 14, 2023

(65) Prior Publication Data
US 2025/0062837 A1 Feb. 20, 2025

(51) Int. Cl.
*H04B 17/11* (2015.01)
*H04B 17/00* (2015.01)
*H04B 17/10* (2015.01)

(52) U.S. Cl.
CPC ......... *H04B 17/11* (2015.01); *H04B 17/0085* (2013.01); *H04B 17/104* (2015.01)

(58) Field of Classification Search
CPC .... H04B 17/11; H04B 17/102; H04B 17/104; H04B 17/318; H04B 17/0085
See application file for complete search history.

(56) References Cited

U.S. PATENT DOCUMENTS

| | | | | |
|---|---|---|---|---|
| 9,654,233 | B2* | 5/2017 | Barabash | H04B 17/00 |
| 11,038,603 | B2* | 6/2021 | Hamilton, II | H04B 17/20 |
| 2010/0234071 | A1* | 9/2010 | Shabtay | H04B 7/155 |
| | | | | 455/562.1 |
| 2012/0053879 | A1* | 3/2012 | Chang | H04B 17/12 |
| | | | | 343/876 |
| 2021/0297165 | A1* | 9/2021 | Luo | H04W 16/28 |
| 2024/0248126 | A1* | 7/2024 | Kim | G01R 29/105 |

* cited by examiner

*Primary Examiner* — Tung X Le
(74) *Attorney, Agent, or Firm* — Hewlett Packard Enterprise Patent Department (57) ABSTRACT

In implementations of the present disclosure, a power compensation determination for radio frequency cable mechanism is provided. An access point (AP) determines a time slot for an RF cable loss measurement on an RF cable, and transmits a test signal with a first TX power to an antenna module over the RF cable. The AP further obtains a second TX power transmitted by the antenna module, and determines an RF cable loss based on the first TX power and the second TX power. The AP further determines power compensation for the RF cable based on the determined RF cable loss, the first TX power and an antenna gain of the antenna module. The AP transmits signals on the RF cable to the antenna module based on the determined power compensation. Implementations of the present disclosure can determine the power compensation based on the RF cable loss automatically.

20 Claims, 7 Drawing Sheets

POWER COMPENSATION DETERMINATION FOR RADIO FREQUENCY CABLE

BACKGROUND

In the field of Wi-Fi, a multiple-input multiple-output (MIMO) technology refers to a practice of housing two or more antennas within a single wireless device. Having multiple antennas with which to receive and transmit data simultaneously, an access point (AP) can become capable of achieving faster data transfer rates. In modernity, the speed of data transmission is essential to any network device, so the MIMO technology has been commonplace in network devices since MIMO was adopted into the Wi-Fi 4 standard and thereafter.

As smartphones are very common to everyone nowadays, wireless accessing is always necessary in outdoor environments. For example, Wi-Fi coverage is important when a group of people have a party or work in a garden or wirelessly connect outdoor cameras or outdoor speakers. The APs installed indoors cannot provide a smooth Wi-Fi experience outdoors due to limited coverage and signal attenuation. Thus, installing outdoor Wi-Fi access points is the common way to provide outdoor Wi-Fi.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

In Wi-Fi deployment, it is necessary to balance AP transmission (TX) powers across all radio frequency (RF) chains. It is to be understood that the TX power value for a signal that came out from different antennas should be the same. Otherwise, it will affect the MIMO transmission performance and/or efficiency. The traditional cask theory describes that for a barrel standing upright with varying stave lengths, the content that the barrel can hold is not determined by the taller staves but by its shortest. Similarly, the lowest power value across all RF chains will determine the throughput values of an AP because the lowest power value will affect the performance of the TX. For example, modulation coding scheme (MCS), number spatial stream (NSS) and bandwidth (BW), and so on in a rate control module may be reduced or decreased.

There are some reasons that may cause the unbalanced TX power per-chain. The first reason is unknown RF cable loss. The RF cable Loss may refer to the amount of power loss over a cable's Length. For example, more power is lost the longer the cable is. The second reason is the aging antenna or loose installation. This could always happen in real deployment sites because the antennas and the RF cables are outdoors. The third reason is the regulations or requirements, for example, the automated frequency coordination (AFC) requirement for the 6 gigahertz (GHz) band.

Therefore, to resolve the issue that the unknown RF cable is difficult to be determined and the output power is different from the target transmission power, there is a need to introduce a solution for determining power compensation for radio frequency cable based on the determined RF cable loss automatically. In some example implementations, the proposed solution can further make sure less affection on MIMO transmission because of fewer gain variations. In some example implementations, the proposed solution can further guarantee the throughput efficiency or performance of an AP system. In some example implementations, the proposed solution can further increase competitiveness with other manufacturers for the usage of smart antenna modules.

Generally, according to implementations of the present disclosure, an AP determines a time slot for an RF cable loss measurement on an RF cable of the AP. The AP is coupled to a plurality of RF cables, and the plurality of RF cables includes the RF cable. The AP transmits a test signal with a first TX power to an antenna module over the RF cable during the time slot. The AP obtains a second TX power transmitted by the antenna module during the time slot. The AP determines an RF cable loss based on the first TX power and the second TX power. The AP determines power compensation for the RF cable based on the determined RF cable loss, the first TX power and an antenna gain of the antenna module. The AP transmits signals on the RF cable to the antenna module based on the determined power compensation.

As an example, if an RF cable loss measurement needs to be done, an AP can be set to a test mode when the AP brings up. The AP may define a time slot, such as the time in the AP bringing up process, and turn the working mode to the test mode. The AP may send out a fixed-duty cycle signal on a single chain. The TX power value is known by the AP as P1. During the test mode, the antenna module (working as an RF power detector) can report the RF power as P2. By calculating the value of P1-P2, the RF cable loss can be determined. In some example implementations, this RF cable loss measurement can be done many times, and an average value can be used as the RF cable loss. Then, the RF cable loss measurement process can be done on other RF chains by switching the RF chain switch until all RF chains are tested. After the RF cable loss for all RF chains is measured, the AP can determine the power compensation for each RF chain, and the AP can transmit signals on each RF chain to the antenna module based on the respective determined power compensation.

This power compensation determination for radio frequency cable mechanism can determine the power compensation based on the RF cable loss automatically. In some implementations, for an MIMO AP, this mechanism can be used for each of the plurality of RF cables, and respective RF cable losses can then be determined. Thus, the power compensation for each RF cable can be determined, and thus it can keep the TX power balanced automatically. It can be used to ensure a high throughput value in transmission on an AP. The advantages of implementations of the present disclosure will be described with reference to example implementations as described below. Reference is made below to FIG. 1 through FIG. 8 to illustrate basic principles and several example implementations of the present disclosure herein.

Figure 1:
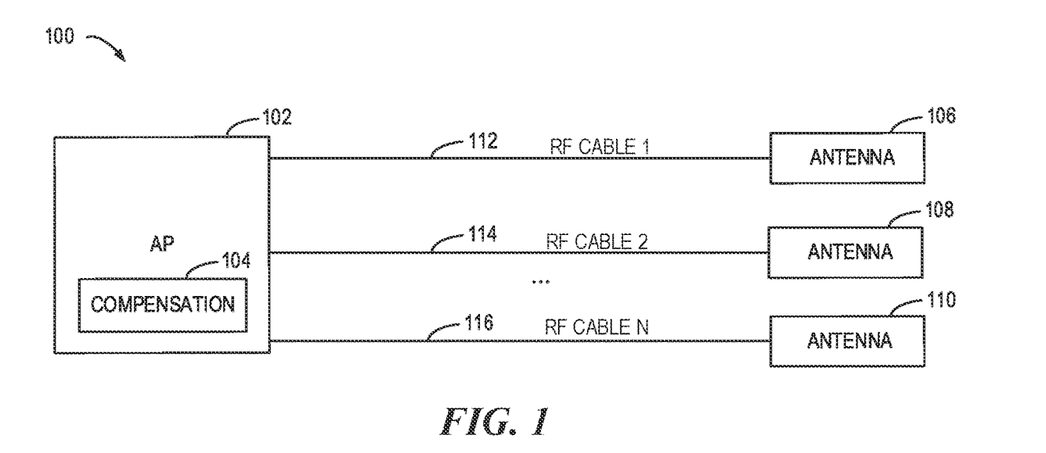
FIG. 1 illustrates an example network environment in which example implementations of the present disclosure may be implemented.

Reference is made to FIG. 1, which illustrates an example network environment 100 in which example implementations of the present disclosure may be implemented. As shown in FIG. 1, the network environment 100 comprises an AP 102 and a plurality of antennas, such as an antenna 106, an antenna 108, and an antenna 110. The AP 102 supports MIMO, and the AP 102 may operate on the 2.4 GHz band. The AP MLD 102 may further operate on the 5 GHz band and the 6 GHz band.

For each band, the AP may use the respective RF cable for transmitting signals. For example, the AP 102 may use RF cable 112 for transmitting 2.4 GHz band signals. The AP 102 may use RF cable 114 for transmitting 5 GHz band signals. The AP 102 may use RF cable 116 for transmitting 6 GHz band signals. It is to be understood that there may be more bands as Wi-Fi technology develops in the future, and the present disclosure supports this development in the future.

The AP 102 may comprise a compensation module 104. The compensation module 104 may have features that can implement the implementations of the present disclosure. For each RF chain (such as 2.4 GHZ, 5 GHZ, and 6 GHZ), the compensation module 104 may measure their respective RF cable loss, and the compensation module 104 may determine the respective transmission power compensation for each RF cable. The AP 102 may transmit signals on the RF cable based on the respective transmission power compensation for each RF cable.

It is to be understood that the order of the RF cables for different RF bands is not limited to what they are shown in FIG. 1. Further, it is to be understood that in FIG. 1 and throughout the present disclosure, the number of any elements is only for the purpose of illustration without suggesting any limitations.

For better understanding of the implementations of the present disclosure, it is necessary to introduce a smart antenna module (SMA) related to the implementations of the present disclosure. Thus, reference is made to FIG. 2, which illustrates an example illustration 200 of an SMA which is used as a power meter according to implementations of the present disclosure.

Figure 2:
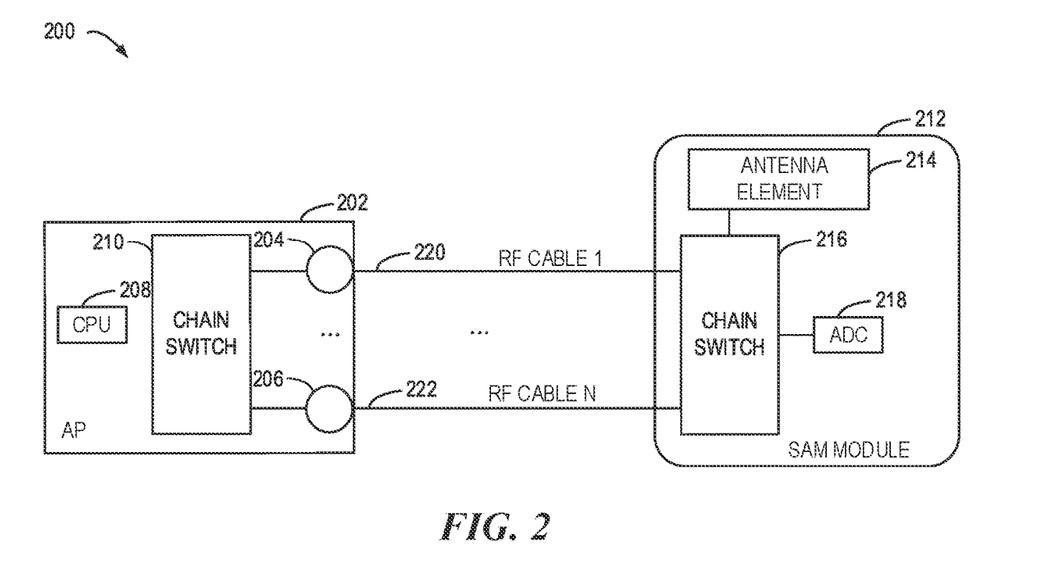
FIG. 2 illustrates an example illustration of a smart antenna Module (SMA) that is used as a power meter according to implementations of the present disclosure.

As shown in FIG. 2, the SMA 212 may enable an AP 202 to automatically adjust the antenna parameters based on the client location and channel information to improve signal quality and stability. The SMA 212 can improve the signal strength at the same location as before and increase the user-experienced Wi-Fi speed. As such, fewer APs are required, reducing customers' investments. However, in the implementations of the present disclosure, the SMA 212 may be used as a power meter or a power detector.

As shown inside the SMA 212, there is a chain switch 216. The chain switch 216 may connect to an antenna element 214, where signals will be transmitted over the air. By switching the chain switch 216, the corresponding RF cable can be connected to an analog-to-digital converter (ADC) 218. The ADC 218 may convert the RF signals into digital values of the RF signals and report the values of the RF signals to a bus (such as an inter-integrated circuit (IIC) bus). The AP 202 may check the IIC bus to read the values.

Similarly, the AP 202 also comprises a chain switch 210. By switching the chain switch 210, corresponding signals are transmitted on corresponding RF cables. For example, 2.4 GHz signals may be transmitted on RF cable 220, and 5 GHz signals may be transmitted on RF cable 222. The RF cable 220 may be connected to the AP 202 via port 204 (such as a MMCX connector).

In some cases, for the RF cables that are installed between AP reverse polarity subminiature version A (RPSMA) (N) and N-type connector for outdoor AP, it is allowed customers to equip different types or lengths of RF cables for different user scenarios, and an AP equipment installer must put in the RF cable loss value of the different RF cables by themselves. After having put in the RF cable loss value of the different RF cables, then a static cable loss value and the antenna gain value will be provided to provision or configure AP. This is a relatively crude measurement process. For example, a person has to connect both ends of an RF cable to a power-meter equipment, and it might take much time for the measurement. This is another reason why the RF cable loss is hard to be determined.

The RF cable 222 may be connected to the AP 202 via port 206. The AP 202 may comprise a CPU 208. It is to be understood that the CPU 208 is shown in the purpose of illustration. The AP may comprise other processors that can implement the implementations of the present disclosure. Reference will be made to FIG. 2 thereafter.

Figure 3:
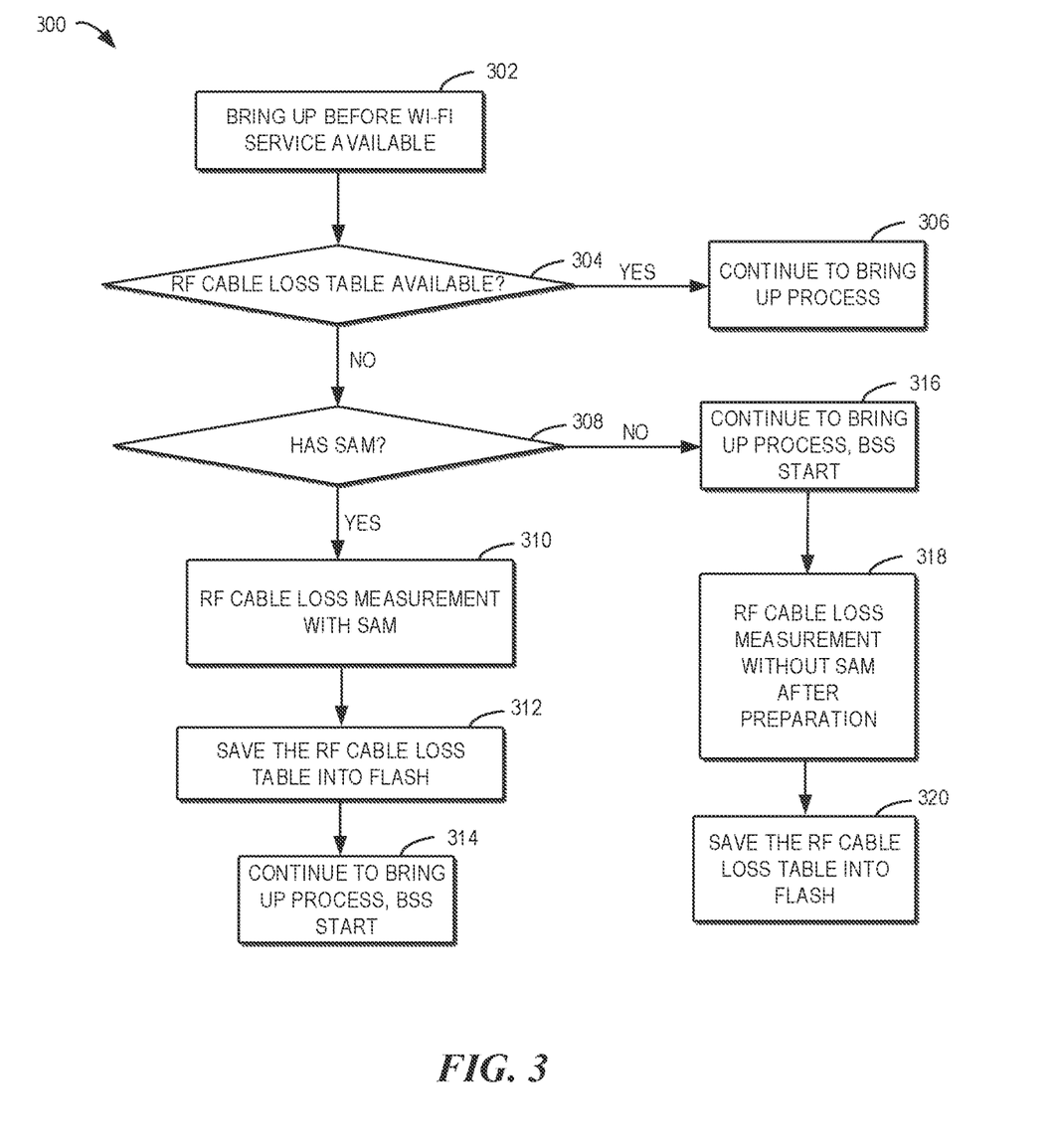
FIG. 3 illustrates an example flow chart of an example process for determining transmission power compensation according to implementations of the present disclosure.

After introducing the SAM 212, now reference is made to FIG. 3, which illustrates an example flow chart of an example process 300 for determining transmission power compensation according to implementations of the present disclosure. In process 300, it describes two scenarios for determining transmission power compensation. One scenario describes determining transmission power compensation with a SAM (such as steps 310, 312, and 314), and the other describes determining transmission power compensation without a SAM (such as steps 316, 318, and 320).

At 302, the AP 202 may bring up before the Wi-Fi is available. In some example implementations, the AP 202 may turn into a test mode from a working mode. In this test mode, the AP 202 may define a time slot in the bringing up process. At 304, the AP 202 may check if the RF cable loss table is available. The RF cable loss table may record the RF cable loss for each RF cable. Thus, if the RF cable loss table is available, then it may not need to measure the RF cable loss again. Therefore, the process 300 may continue to 306. At 306, the AP 202 may continue to bring up, and the AP 202 may turn into the working mode.

If the RF cable loss table is not available at 304, the process 300 may continue to 308. At 308, the AP 202 may check if a SAM 212 is available. If the SAM 212 is available, the SAM 212 can be used as the power meter, and thus the process 300 may continue to 310. If the SAM 212 is not available, the process 300 may continue to 316, where a nearby AP can be used to measure the RF cable loss.

At 310, the AP may measure the RF cable loss with the SAM 212. The RF cable loss may refer to the amount of power loss over a cable's Length. For example, more power is lost the longer the cable is. Another term for the cable loss can be "insertion loss." Cable loss may be a factor to be considered in outdoor Wi-Fi deployment system design.

Signal leaks can be caused by loose connectors, damaged equipment or cables, or cables that are unterminated (not connected to a device, panel, or wall outlet).

For example, the AP 202 may select the RF cable 220 to do the measurements. During the time slot, the AP 202 may send a fixed duty cycle signal. In some example implementations, the fixed duty cycle signal may be a sine wave. In some example implementations, the duty cycle signal may be a (802.11n, HT 20, mcs0, TX 99) signal (a specified TX signal as defined in the specification of 802.11n). It is to be understood that other fixed duty cycle signals may also apply for the testing mode.

The test signal that is transmitted by the AP 202 may be in a TX power known as P1. During the test, for a time slot (such as 100 milliseconds), the SAM 212 may report the received RF power to the ADC 218. In some example implementations, the received RF power may be in a precision of one dB, but this is only an example without limitations.

The AP 202 (for example, the CPU 208) may check the IIC bus to read the power value, and records the power value as P2. By calculating P1-P2 as the RF cable loss, the RR cable loss may be determined. In some example implementations, this measurement may be repeated many times, for example, repeated 5 times. The AP 202 may take the average value as the final RF cable loss for the RF cable 220.

After the measurement of the RF cable loss for the RF cable 220, the AP 202 may select other RF cables by switching the chain switch 216. For example, RF cable 222 may be selected to be measured. These measurements may be done until all the RF cable tested.

At 312, the AP 202 may save the measured RF cable losses for each RF cable as an RF cable loss table into its flash. At 314, the AP 314 may continue to bring up process, and a basic service set (BSS) may start.

In some example implementations, after determining the RF cable loss for an RF cable, power compensation may be further determined. In some example implementations, if the RF cable loss table is already there, power compensation may also be determined. According to example implementations of the present disclosure, an RF loss compensating algorithm is proposed. Before introducing the RF loss compensating algorithm, some terms will be introduced first to help understand the RF loss compensating algorithm.

As used herein, the target power may be a user-configured power value, which is in an EIRP in decibels relative to one milliwatt (dBm). It is also known as software-programmed TX power. This is user's target power value, and it can be changed after power compensation.

The antenna gain can be an actual antenna gain (dB) values on different chains. The antenna gain value is related to channel frequency. The antenna gain values can be used differently in different APs. External antenna gain connected to an AP may be stored as a provisioning parameter, and internal antenna gains may be defined in AP configuration tables. The antenna gain value table may be provided by factory, and thus these values are static. In some old designs, considering the federal communications commission (FCC) requirement, only the one max antenna gain value is needed for all RF chains and all frequencies.

The RF cable loss can be a negative gain (dB) value in an RF cable. The compensated target power can be compensation software programmed TX power value (in dBm) with antenna connectors. The output power can be the actual TX power out value with an antenna. The max output power limit can be limited by board limits, region, AFC requirements, and so on. The actual output power value needs to be limited to certain values if it reaches the max output power limit, and thus it can be considered as a threshold.

For example, the automated frequency coordination (AFC) requirement for 6 gigahertz (GHz) band. It is to be understood that AFC is a system that calculates available frequencies based on the location information of unlicensed devices. The AFC system can use the information about incumbent systems to determine operation channel and different TX power limitations for standard power (SP) TX modes availability in a specific location, so an AFC-certificated AP needs to correct its equivalent isotropic radiated power (EIRP) to comply with the requirement of the AFC system.

Antenna gain and RF cable loss are on a per-channel and per-chain basis, and the target is to achieve the equal actual TX power transmitting out of the antennas, and for one specific channel, the output power can describe as formulas (1)-(3) below:

$$\text{CompTargetPower} = \text{TargetPower} - \text{AntennaGain} - \text{RF CableLoss} \quad (1)$$

$$\text{powerLimit} = \text{Min}(\text{Board}, \text{Region}, \text{AFC}, \text{etc.}) \quad (2)$$

$$\text{OutputPower} = \text{Min}(\text{TargetPower}, \text{PowerLimit}) \quad (3)$$

where CompTargetPower represents the compensated target power; Min represents the operation of determining the minimum value. It is to be understood that all units related formulas may be unified into a same system of units when doing the calculation.

As an example, before compensation, if the target power is 20 dB, the RF cable loss is −3 dB, the antenna gain is 5 dB, and the actual output power is 20−3+5=22 dB. According to formula (1), the compensated target power is 20−5−(−3)=18 dB. According to formula (2), the power limit is 25 dB in this example. Thus, after compensation, according to formula (3), the output power is a minimum value of 20 and 25, and is 20 dB in this example. Therefore, the final actual TX power transmitting out of the antenna is compensated target power−RF Cable loss+Antenna Gain, which is equal to 18−3+5=20 dB, which satisfies the required output power.

For detailed examples, tables 1 and 2 show the case that a 4×4 MIMO AP that works on 5G channel 36. Assuming all power value is less than the power limitation, it may have the below power relationship, as shown in table 1 below.

TABLE 1

BEFORE COMPENSATION

| | Channel 5G 36 5180 MHz 4 × 4 AP Chain Number | | | |
|---|---|---|---|---|
| | Chain 0 | Chain 1 | Chain 2 | Chain 3 |
| Target Power (dBm) | 20 | 20 | 20 | 20 |
| RF Cable loss (dB) | −4 | −3 | −2 | −1 |
| Antenna Gain (dB) | 4 | 5 | 6 | 7 |
| Output Power (dBm) | 20 | 22 | 24 | 26 |

Table 2 shows the case that after compensation, how the compensation target power values are determined.

TABLE 2

AFTER COMPENSATION

Channel 5G 36 5180 MHz
4 × 4 AP
Chain Number

|  | Chain 0 | Chain 1 | Chain 2 | Chain 3 |
|---|---|---|---|---|
| Compensation Target Power (dBm) | 20 | 18 | 16 | 14 |
| RF Cable loss (dB) | −4 | −3 | −2 | −1 |
| Antenna Gain (dB) | 4 | 5 | 6 | 7 |
| Output Power (dBm) | 20 | 20 | 20 | 20 |

It can be seen that before compensation, the output power for all RF chains is different. After compensation, the output powers for all RF chains are balanced to 20 dB. A Factory or a manufacturer can do the full band TX power calibration for antenna gain, so antenna gain values is known values, but the RF cable loss value is determined by actual RF cable usage in customer product environment, and thus there is a need to design a solution for measuring the RF cable loss, even if there is no SMA.

As discussed above, if the SAM 212 is not available, the process 300 may continue to 316, where a nearby AP can be used to measure the RF cable loss. At 306, the AP 202 may continue to bring up process. At 318, the AP 202 performs RF cable loss measurement without a SAM after preparation. The details of the approach for performing RF cable loss measurement without a SAM will be described with reference to FIG. 4, and thus for brevity, it will not be discussed here. At 320, the AP 202 may save the RF cable loss table into its flash.

Figure 4:
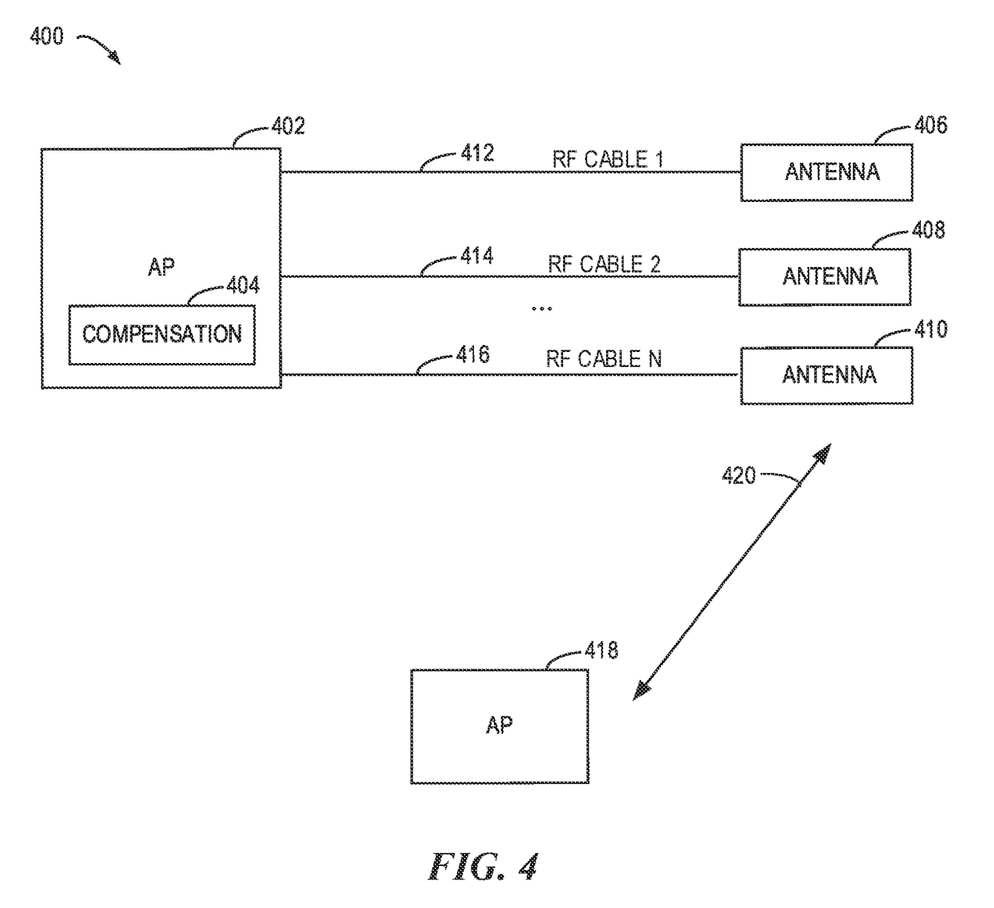
FIG. 4 illustrates an example block diagram of performing RF cable loss measurement without a SAM according to implementations of the present disclosure.

Reference is made to FIG. 4, which illustrates an example block diagram 400 of performing RF cable loss measurement without a SAM according to implementations of the present disclosure. The high level idea of FIG. 4 is that the RF cable loss measurement can be checked if setting the transmit power of a frame and try to get its received signal strength indicator (RSSI) signal from a monitor device. Because the user sets absolute transmit power per RF chain, the final test procedure could be to measure absolute power of the frames generated by the AP, and this test procedure can be done after the AP begins Wi-Fi services.

As shown in FIG. 4, the AP 402 may correspond to the AP 102 in FIG. 1. The compensation module 404 may correspond to the compensation module 104 in FIG. 2. The RF cables 412, 414 and 416 may correspond to RF cables 112, 114 and 116, respectively. The antennas 406, 408 and 410 may correspond to the antennas 106, 108 and 110. For brevity, these similar elements will not be described again.

The AP 402 may pick up a nearby AP (for example, AP 418) as a monitor AP. The AP 402 may be called a working AP in this situation. The AP 402 may try to evaluate the air path loss from the working AP 402 to the monitor AP 418. The air path loss evaluate algorithm method is related to parameters like distance, channel band, channel frequency and so on. The air path loss is the loss in signal strength of a signal as it travels through free space (like the air). This value is usually calculated by discounting any obstacles or reflections that might occur in its path. These parameters are used as input and an estimation of the air path loss can be calculated.

The AP 402 may select proper test time and a time duration. This may need to negotiate between the working AP 402 and the monitor AP 418. The monitor AP 418 may need to capture the test frames from the working AP 402. In some example implementations, some suggestions can be used to avoid traffic interruption. For example, test frames may be any of unicast, fixed rate, fixed TX power value (not reach the power limitation) for a single chain, and legacy (non-high throughput (HT), non-very high throughput (VHT), or non-high efficiency (HE)). For another example, the test procedure may be inside the scan dwell time on working AP 402. For a further example, multi-user (MU) may be disabled temporarily before testing on working AP 402, and no need to de-authenticate the client at all after disabling the MU feature (MIMO/orthogonal frequency-division multiple access (FDMA)). For another example, a request to send/clear to send (RTS/CTS) or quiet internet explorer (IE) period can be used to protect the test procedure.

The AP 402 may tune the TX chain mask to a single chain mode on the working AP 402 and may capture the packets on the monitor AP 418 when it is time for the test and needs to test all chains. The AP 418 may decode the RSSI values from the captured packets and noise factor (NF) values (in dBm, here is a positive value) on monitor AP 418 from the air path 420. The AP 402 may calculate the received (RX) signal strength from the signal-to-noise ratio (SNR) value, and values can be an average, a maximum or a minimum value. The formula is as follows:

$$RSSI = RX\ SignalStrength = NF + SNR \qquad (4)$$

The AP 402 may calculate the TX signal strength (output power of the working AP 402) value and RF cable loss by using formulas (5)-(6) as follows:

$$TX\ SignalStrength = RX\ SignalStrength - AirPathLoss \qquad (5)$$

$$RF\ CableLoss = OutputPower - AntennaGain \qquad (6)$$

where formula (6) can be rewritten as formula (7) as follows:

$$RF\ CableLoss = NF + SNR - AirPathLoss - AntennaGain \qquad (7)$$

It is to be understood that the NF, RSSI, and air path loss values might introduce unnecessary deviation, and it may run more testing to ensure the accuracy of the RF cable loss.

By implementing the example implementations of FIG. 4, even if there is no SMA, the RF cable loss can still be estimated. Thus, the use case is broadened to almost any outdoor Wi-Fi deployment because almost any outdoor Wi-Fi deployment has two or more APs.

Figure 5:
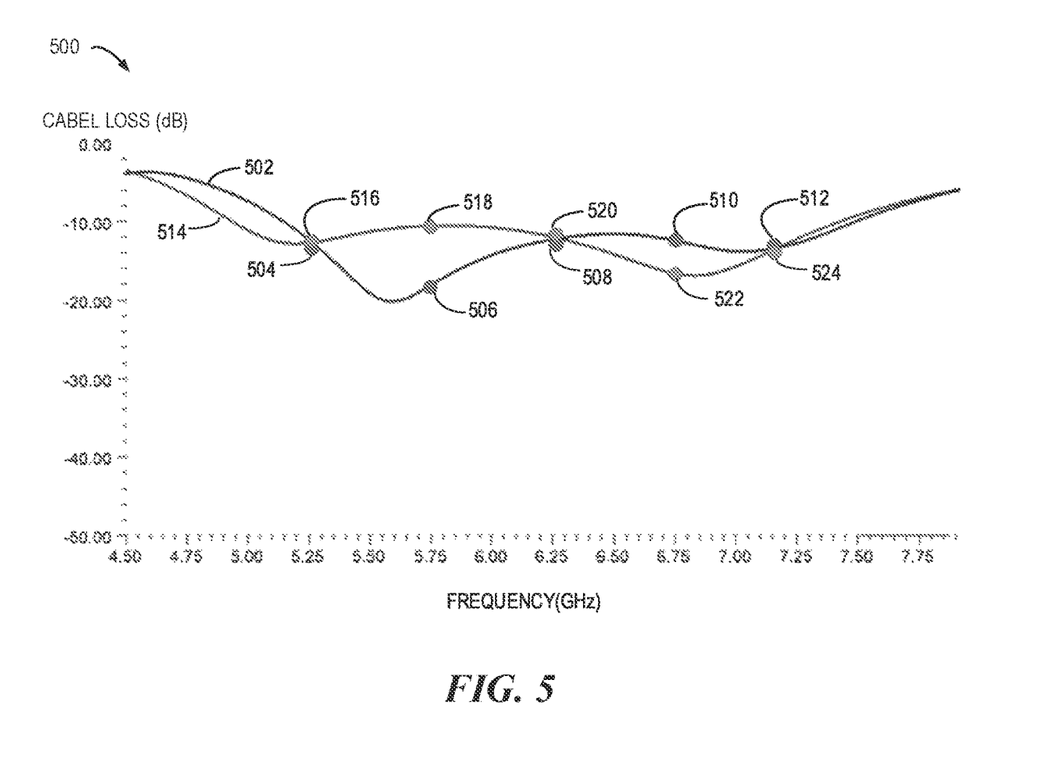
FIG. 5 illustrates an example relationship between RF cable loss and frequency related to implementations of the present disclosure.

Reference is made to FIG. 5, which illustrates an example relationship 500 between RF cable loss and frequency related to implementations of the present disclosure. As discussed above, for a MIMO AP, assuming the number of channels is N, and the number of RF chains is C, the need to perform the RF cable loss measurements is a value of N times C. To accelerate this, according to some implementations of the present disclosure, N can be reduced by using an interpolation algorithm with some tested point values on different frequencies. FIG. 5 shows the relationship between RF cable loss and frequency.

As shown in FIG. 5, a curve 502 represents RF cable loss for RF cable 1, and a curve 514 represents RF cable loss for RF cable 2. The points 504, 506, 508, 510, and 512 are points that have been measured. The curve 502 is determined by using interpolation algorithm based on the points 504, 506, 508, 510, and 512. Similarly, the points 504, 506, 508, 510, and 512 are points that have been measured. The curve 514 is determined by using an interpolation algorithm based on the points 516, 518, 520, 522, and 524.

It can be seen from FIG. 5 that the relationship between the RF cable loss and the frequency is non-linear. Thus, the interpolation algorithm is more accurate than a combined method, and it needs to make sure all the tested point value is correct with the test result. For example, for RF cables 1 and 2, the test point values are shown in Table 3.

TABLE 3

FREQUENCY AND RF CABLE LOSSES FOR TEST POINTS

| Frequency | 5.25 | 5.75 | 6.25 | 6.75 | 7.25 |
|---|---|---|---|---|---|
| RF cable loss for cable 1 | −13 | −18 | −12 | −13 | −14 |
| RF cable loss for cable 2 | −13 | −10.5 | −12 | −17 | −14 |

Referring to FIG. 5, the points 504 and 516 represents 5.25 GHZ. The points 506 and 518 represent 5.75 GHz and the like. Thus, five test results for each cable in full 5 GHz and 6 GHz band (five test points can be enough for the curve interpolation calculation).

Figure 6:
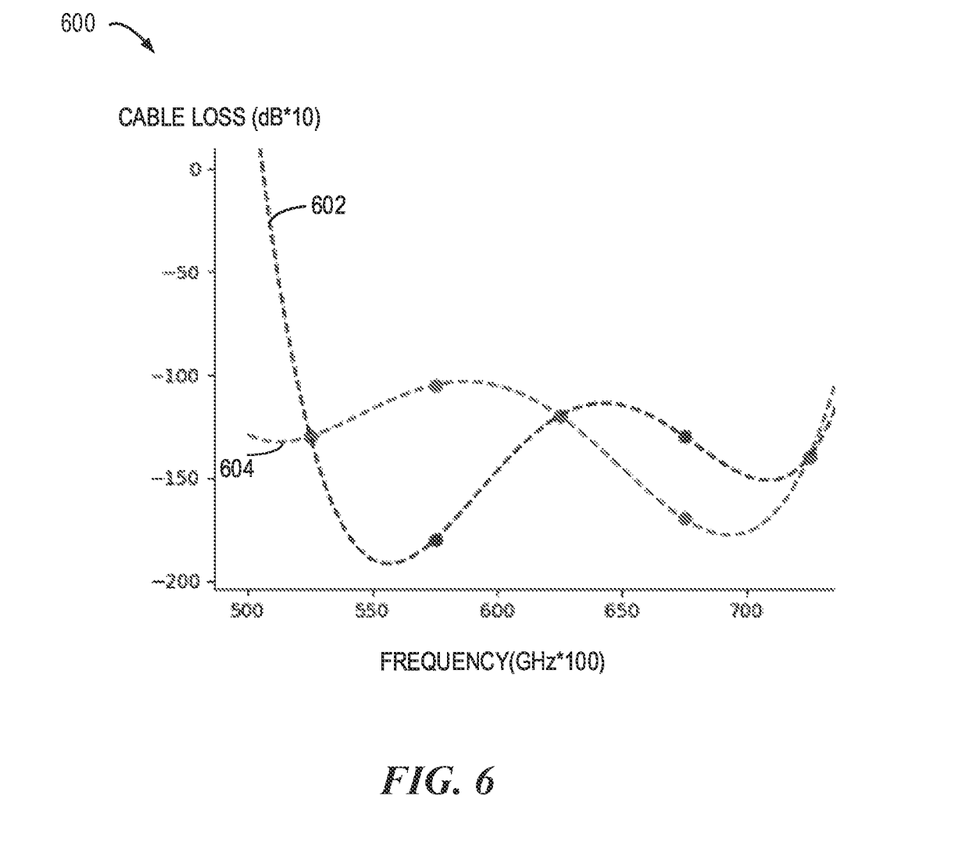
FIG. 6 illustrates an example illustration of the RF cable losses determined by an interpolation algorithm according to implementations of the present disclosure.

Reference is made to FIG. 6, which illustrates an example illustration 600 of the RF cable losses determined by an interpolation algorithm according to implementations of the present disclosure. On the basis of FIG. 5, because the relationship between the RF cable loss and the frequency is non-linear, the interpolation algorithm like Lagrange or Newton interpolating polynomial is recommended.

As shown in FIG. 6, a dashed curve 602 and a dashed curve 604 are determined by using the Newton interpolating approach. the dashed portion of the curves 602 and 604 can be used to fill the full band RF cable loss calculation. Therefore, the number of RF cable loss measurements can be saved. For example, for an AP, the number of channels is 16, and the number of RF chains is 3, the need to perform the RF cable loss measurements is 16×3=48 times. However, by using the Newton interpolating approach, the number of performing the RF cable loss measurements is reduced to 10.

In some example implementations, by using the above results, if any RF cable loss is much higher than the other values, it may mean the deviation value reached a predefined threshold value, then it may need to try to perform the compensation process and warn the customer about this event, and it may need to notify the customer the compensation result. In some example implementations, some SMA already has the feature for antenna and RF filters broken detection. However, this feature can be improved with the RF cable loss compensation.

Figure 7:
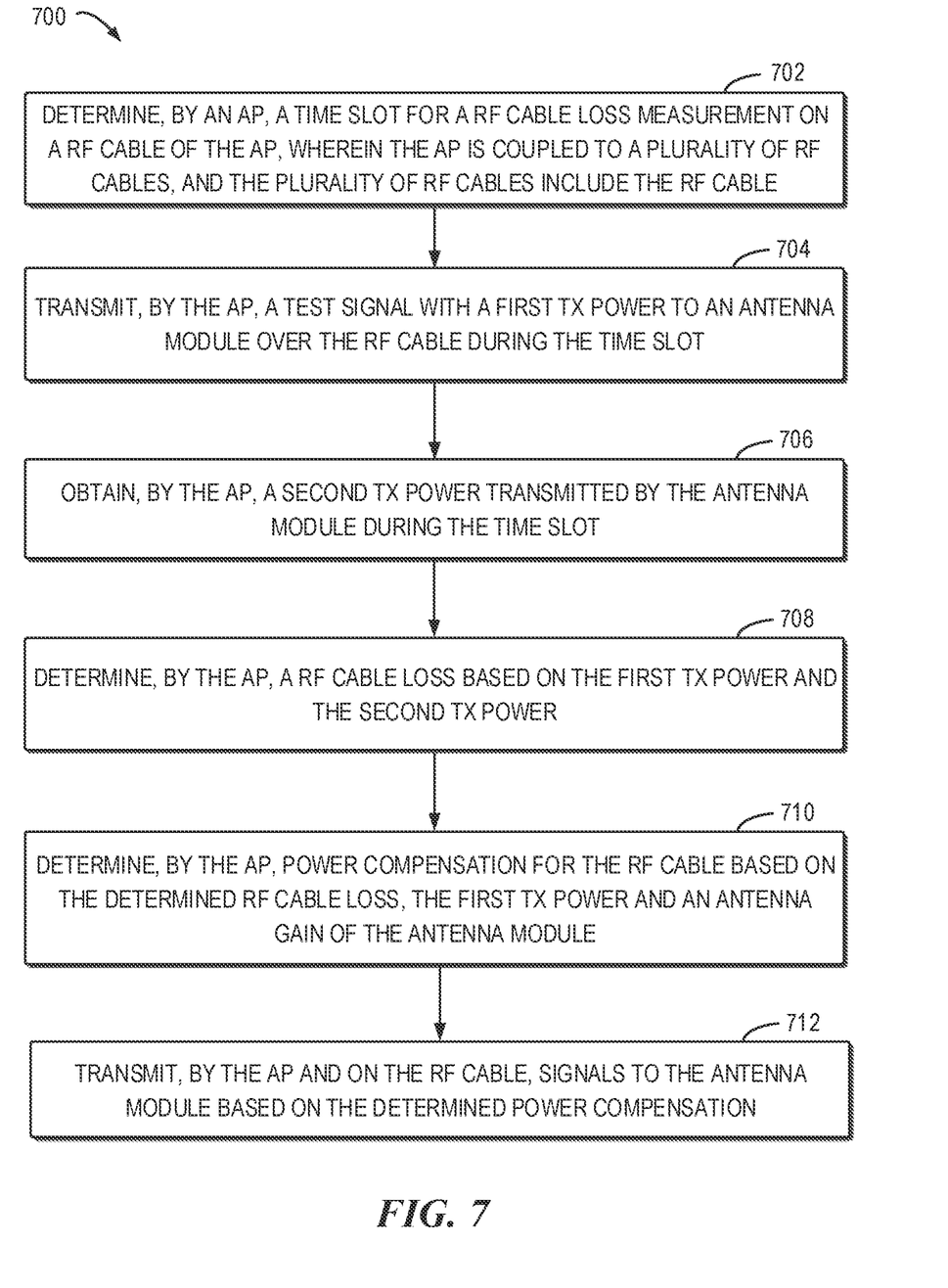
FIG. 7 illustrates an example flow chart of an example method for determining transmission power compensation according to implementations of the present disclosure.

Reference is made to FIG. 7, which illustrates an example flow chart of an example method 700 for determining transmission power compensation according to implementations of the present disclosure, and the method 700 may be performed by an access point such as the AP 102. For clarity, reference will be made in combination with FIG. 1.

At 702, the AP 102 determines a time slot for an RF cable loss measurement on an RF cable of the AP 102. As an example, a time slot may be determined for the RF cable loss measurement on an RF cable 112 of the AP 102. At 704, the AP 102 transmits a test signal with a first TX power to an antenna module over the RF cable during the time slot. As an example, the AP 102 may transmit a sine wave signal with a power P1 to the antenna module 106 over the RF cable 112 during the time slot.

At 706, the AP 102 obtains a second TX power transmitted by the antenna module during the time slot. As an example, the AP 102 may obtain a power value of P2 as the second TX power transmitted by the antenna module 106 during the time slot. At 708, the AP 102 determines an RF cable loss based on the first TX power and the second TX power. As an example, the RF cable loss may be determined by calculating the value of P1-P2.

At 710, the AP 102 determines power compensation for the RF cable based on the determined RF cable loss, the first TX power and an antenna gain of the antenna module. As an example, using the formulas (1) as discussed with FIG. 3, the AP 102 may determine a power value by subtracting the determined RF cable loss and the antenna gain from P1.

At 712, the AP 102 transmits signals to the antenna module based on the determined power compensation. As an example, the AP 102 may determine to transmit the signals to the antenna module 106 by adding the determined RF cable loss into the compensated TX power. For brevity, the details of the RF cable loss determination process and RF cable loss compensation process have been already discussed with reference to FIGS. 3 and 4, and thus it will not be discussed herein.

According to implementations of the present disclosure, the power compensation determination for radio frequency cable mechanism can determine the power compensation based on the RF cable loss automatically. In some example implementations, it can further keep the TX power balanced automatically. In some example implantations, it can be used to ensure the high throughput value in transmission on an AP. Affection on MIMO transmission can be reduced because of less gain variations. In some example implantations, the throughput efficiency or performance of an AP system can be guaranteed. In some example implementations, the proposed solution can increase competitiveness with other manufacturers for the usage of the smart antenna modules.

Figure 8:
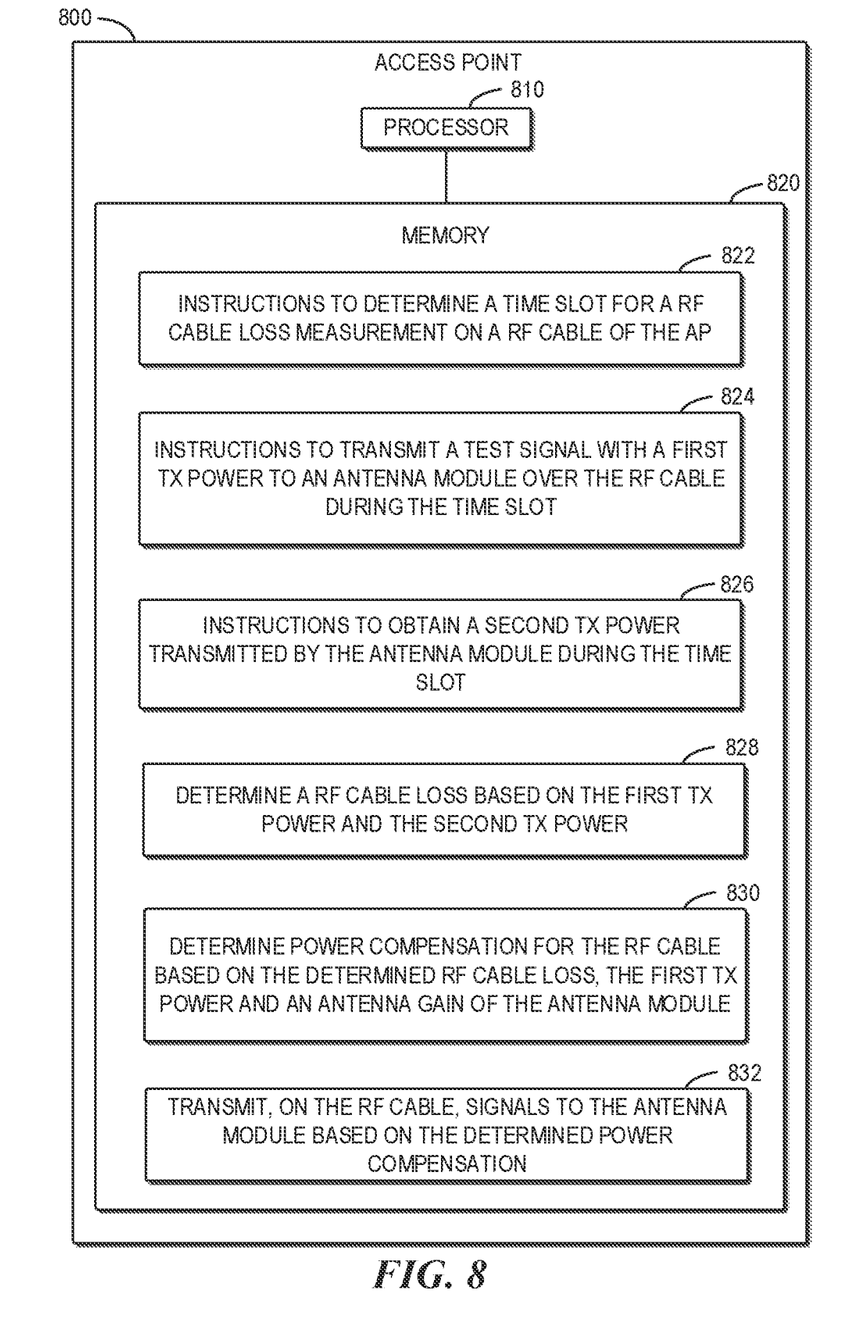
FIG. 8 illustrates an example AP according to implementations of the present disclosure.

Reference is made to FIG. 8, which illustrates an example access point 800 according to implementations of the present disclosure. As shown in FIG. 8, the AP 800 comprises at least one processor 810, and a memory 820 coupled to the at least one processor 810. The memory 820 stores instructions 822, 824, 826, 828, 830 and 832 to cause the processor 810 to perform actions according to example implementations of the present disclosure. As shown in FIG. 8, the memory 820 stores instructions 822 to determine a time slot for an RF cable loss measurement on an RF cable of the AP, wherein the AP is coupled to a plurality of RF cables, and the plurality of RF cables include the RF cable. The memory 820 further stores instructions 824 to transmit a test signal with a first TX power to an antenna module over the RF cable during the time slot.

The memory 820 further stores instructions 826 to obtain a second TX power transmitted by the antenna module during the time slot. The memory 820 further stores instructions 828 to determine an RF cable loss based on the first TX power and the second TX power. The memory 820 further stores instructions 830 to determine power compensation for the RF cable based on the determined RF cable loss, the first TX power, and an antenna gain of the antenna module. The memory 820 further stores instructions 832 to transmit, on the RF cable, signals to the antenna module based on the determined power compensation.

The stored instructions and the functions that the instructions may perform can be understood with reference to the description of FIGS. 2-7. For brevity, the details of instructions 822, 824, 826, 828, 830, and 832 will not be discussed herein.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   determining, by an access point (AP), a time slot for a radio frequency (RF) cable loss measurement on an RF cable of the AP, wherein the AP is coupled to a plurality of RF cables, and the plurality of RF cables include the RF cable;
   transmitting, by the AP, a test signal with a first transmission (TX) power to an antenna module over the RF cable during the time slot;
   obtaining, by the AP, a second TX power transmitted by the antenna module during the time slot;
   determining, by the AP, an RF cable loss based on the first TX power and the second TX power;
   determining, by the AP, power compensation for the RF cable based on the determined RF cable loss, the first TX power and an antenna gain of the antenna module; and
   transmitting, by the AP and on the RF cable, signals to the antenna module based on the determined power compensation.

2. The method according to claim 1, further comprising:
   selecting, by the AP, a second RF cable from the plurality of RF cables, wherein the second RF cable is different from the RF cable;
   determining, by the AP, second power compensation for the second RF cable; and
   transmitting, by the AP and on the second RF cable, signals to the antenna module based on the second power compensation for the second RF cable.

3. The method according to claim 1, wherein determining the power compensation for the RF cable based on the determined RF cable loss comprises:
   determining, by the AP, a power value by subtracting the determined RF cable loss and the antenna gain from the first TX power; and
   in response to determining the power value being greater than a predetermined power limit, determining, by the AP, the predetermined power limit as a compensated TX power; or
   in response to determining the power value being less than the predetermined power limit, determining, by the AP, the determined power value as the compensated TX power.

4. The method according to claim 3, wherein the predetermined power limit comprises a minimum power value among at least the following: a board limit power, a region limit power, and an automated frequency coordination (AFC) requirement power.

5. The method according to claim 4, wherein transmitting the signals to the antenna module based on the determined power compensation comprises:
   transmitting, by the AP, the signals to the antenna module by adding the determined RF cable loss into the compensated TX power.

6. The method according to claim 1, wherein determining the RF cable loss based on the first TX power and the second TX power comprises:
   determining, by the AP, a set of second TX powers iteratively for predetermined times; and determining, by the AP, a difference of the first TX power and an average of the set of second TX powers as the RF cable loss.

7. The method according to claim 6, wherein RF cable losses for others of the plurality of RF cables are estimated based on a first RF cable loss for a first RF cable and a second RF cable loss for a second RF cable using an interpolation approach.

8. The method according to claim 1, further comprising:
selecting, by the AP, a second AP which is adjacent to the AP;
obtaining, by the AP, an air path loss from the AP to the second AP;
transmitting, by the AP, a test packet to the second AP; and
determining, by the AP, the RF cable loss based on received signal strength indicator (RSSI) value of the test packet received by the second AP, the air path loss and a noise factor (NF) value of the second AP.

9. The method according to claim 8, wherein the RF cable loss is determined by subtracting the air path loss and the antenna gain from a sum of the NF value and a signal-to-noise ratio (SNR) value related to the RSSI value.

10. An access point (AP) comprising:
at least one processor; and
a memory coupled to the at least one processor, the memory storing instructions to cause the at least one processor to:
determine a time slot for a radio frequency (RF) cable loss measurement on an RF cable of the AP, wherein the AP is coupled to a plurality of RF cables, and the plurality of RF cables include the RF cable;
transmit a test signal with a first transmission (TX) power to an antenna module over the RF cable during the time slot;
obtain a second TX power transmitted by the antenna module during the time slot;
determine an RF cable loss based on the first TX power and the second TX power;
determine power compensation for the RF cable based on the determined RF cable loss, the first TX power and an antenna gain of the antenna module; and
transmit, on the RF cable, signals to the antenna module based on the determined power compensation.

11. The AP of claim 10, wherein the memory further storing instructions to cause the at least one processor to:
select a second RF cable from the plurality of RF cables, wherein the second RF cable is different from the RF cable;
determine second power compensation for the second RF cable; and
transmit, on the second RF cable, signals to the antenna module based on the second power compensation for the second RF cable.

12. The AP of claim 10, wherein the instructions to determine the power compensation for the RF cable based on the determined RF cable loss comprise instructions to cause the at least one processor to:
determine a power value by subtracting the determined RF cable loss and the antenna gain from the first TX power; and
in response to determining the power value being greater than a predetermined power limit, determine the predetermined power limit as a compensated TX power; or
in response to determining the power value being less than the predetermined power limit, determine the determined power value as the compensated TX power.

13. The AP of claim 12, wherein the predetermined power limit comprises a minimum power value among at least the following: a board limit power, a region limit power, and an automated frequency coordination (AFC) requirement power.

14. The AP of claim 13, wherein the instructions to transmit the signals to the antenna module based on the determined power compensation comprise instructions to cause the at least one processor to:
transmit the signals to the antenna module by adding the determined RF cable loss into the compensated TX power.

15. The AP of claim 10, wherein the instructions to determine the RF cable loss based on the first TX power and the second TX power comprise instructions to cause the at least one processor to:
determine a set of second TX powers iteratively for predetermined times; and
determine a difference of the first TX power and an average of the set of second TX powers as the RF cable loss.

16. The AP of claim 15, wherein RF cable losses for others of the plurality of RF cables are estimated based on a first RF cable loss for a first RF cable and a second RF cable loss for a second RF cable using an interpolation approach.

17. A non-transitory computer-readable medium comprising instructions stored thereon which, when executed by an access point (AP), cause the AP to:
determine a time slot for a radio frequency (RF) cable loss measurement on an RF cable of the AP, wherein the AP is coupled to a plurality of RF cables, and the plurality of RF cables include the RF cable;
transmit a test signal with a first transmission (TX) power to an antenna module over the RF cable during the time slot;
obtain a second TX power transmitted by the antenna module during the time slot;
determine an RF cable loss based on the first TX power and the second TX power;
determine power compensation for the RF cable based on the determined RF cable loss, the first TX power and an antenna gain of the antenna module; and
transmit, on the RF cable, signals to the antenna module based on the determined power compensation.

18. The non-transitory computer-readable medium of claim 17, wherein the memory further storing instructions to cause the AP to:
select a second RF cable from the plurality of RF cables, wherein the second RF cable is different from the RF cable;
determine second power compensation for the second RF cable; and
transmit, on the second RF cable, signals to the antenna module based on the second power compensation for the second RF cable.

19. The non-transitory computer-readable medium of claim 17, wherein the instructions to determine the power compensation for the RF cable based on the determined RF cable loss comprise instructions to cause the AP to:
determine a power value by subtracting the determined RF cable loss and the antenna gain from the first TX power; and in response to determining the power value being greater than a predetermined power limit, determine the predetermined power limit as a compensated TX power; or in response to determining the power value being less than the predetermined power limit, determine the determined power value as the compensated TX power.

20. The non-transitory computer-readable medium of claim 19, wherein the predetermined power limit comprises a minimum power value among at least the following: a board limit power, a region limit power, and an automated frequency coordination (AFC) requirement power.

* * * * *